United States Patent
Nichols, IV

[11] Patent Number: 5,730,405
[45] Date of Patent: Mar. 24, 1998

[54] RETAINER FOR RETAINING COOKING UTENSILS OVER COOKWARE

[76] Inventor: Charles Walter Nichols, IV, 75 Rockefeller Plz., New York, N.Y. 10019

[21] Appl. No.: 594,636

[22] Filed: Feb. 2, 1996

[51] Int. Cl.$^6$ ............................................. A47G 21/14
[52] U.S. Cl. ................ 248/213.2; 248/37.6; 248/231.81
[58] Field of Search ................... 248/213.2, 37.3, 248/37.6, 231.81, 110, 309.1, 206.5; 211/65, 70.7

[56] References Cited

U.S. PATENT DOCUMENTS

| | | | |
|---|---|---|---|
| 927,088 | 7/1909 | Wallace | 248/37.3 |
| 1,304,628 | 5/1919 | Thornton | 248/37.6 |
| 1,928,995 | 10/1933 | DeBiasi | 248/213.2 X |
| 2,298,901 | 10/1942 | Pickering | 248/37.6 |
| 2,314,755 | 3/1943 | Ballarino | 248/231.81 X |
| 2,371,537 | 3/1945 | Mangini | 211/70.7 |
| 2,530,470 | 11/1950 | Kenly | 248/37.6 |
| 2,590,286 | 3/1952 | Wirtanen et al. | 248/37.6 |
| 2,696,630 | 12/1954 | LaMountain | 211/65 X |
| 2,919,086 | 12/1959 | McMahan | 248/206.5 X |
| 3,729,158 | 4/1973 | Nagy | 248/110 |
| 4,632,347 | 12/1986 | Jurgich | 248/213.2 |
| 4,867,410 | 9/1989 | Jurgich | 248/37.3 X |
| 4,991,803 | 2/1991 | Buder | 248/113 |
| 5,083,733 | 1/1992 | Marino et al. | 248/110 |
| 5,277,802 | 1/1994 | Goodwin | 210/202 |
| 5,489,078 | 2/1996 | Risley | 248/231.81 |
| 5,518,211 | 5/1996 | Gaskill et al. | 248/37.6 |

*Primary Examiner*—Robert W. Gibson, Jr.
*Assistant Examiner*—Stephen S. Wentsler
*Attorney, Agent, or Firm*—Corbin Gittes & Samuel

[57] ABSTRACT

A retainer for retaining cooking utensils, such as spoons, forks, ladles, spatulas and stirrers over open cookware. Any food residue on the utensil drips back into the cookware as the utensil is being retained. A person may easily grasp the utensil by its handle without disturbing the cookware. The retainer includes a clipping portion which comprises spaced leg or legs connected to a retainer portion. The retainer portion includes an upper plate and lower plate spaced apart by an arm. The retainer portion retains a cooking utensil between a location of contact on the upper plate and the lower plate to extend the cooking utensil over the rim of cookware.

9 Claims, 5 Drawing Sheets

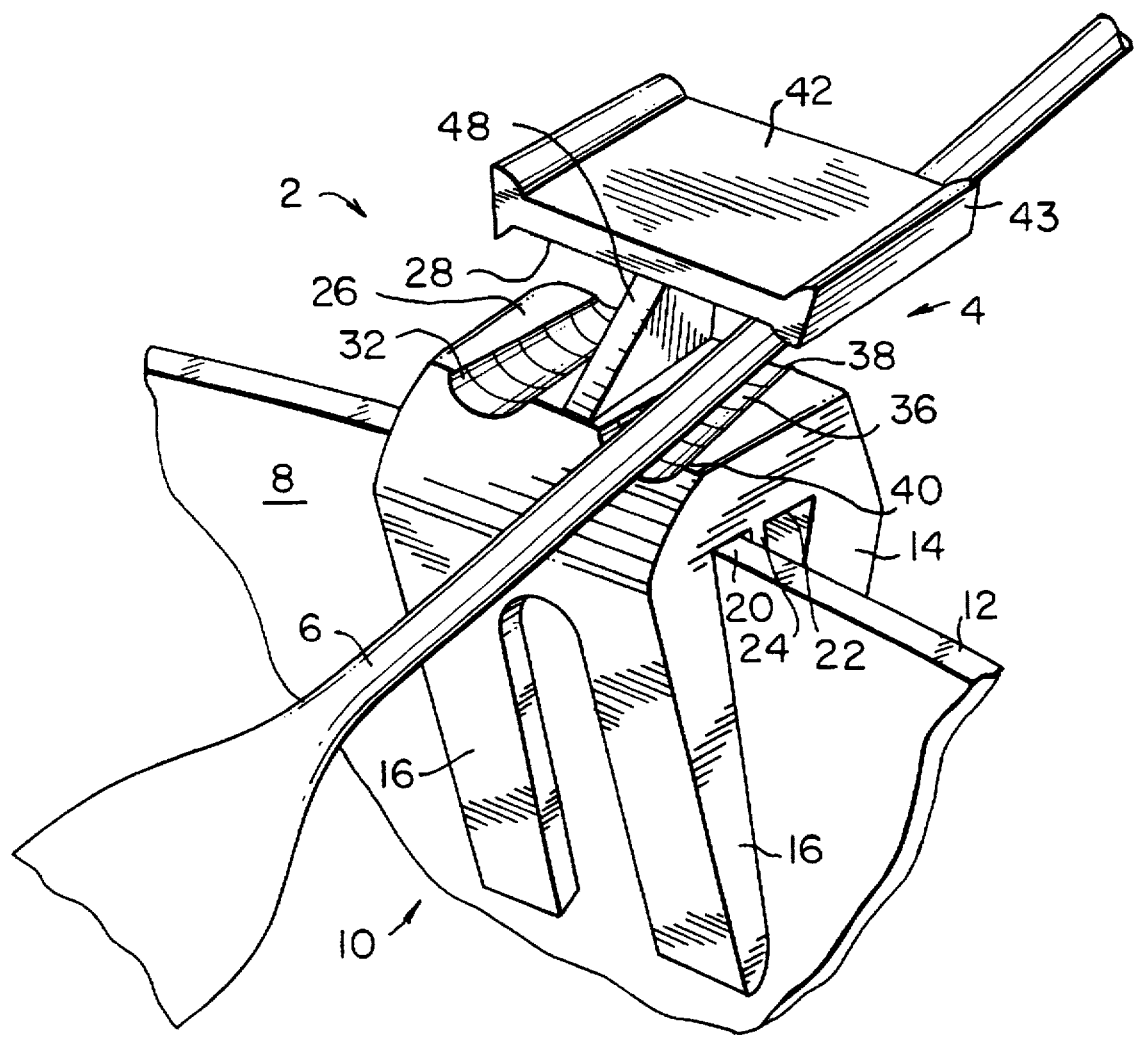
F I G. 1

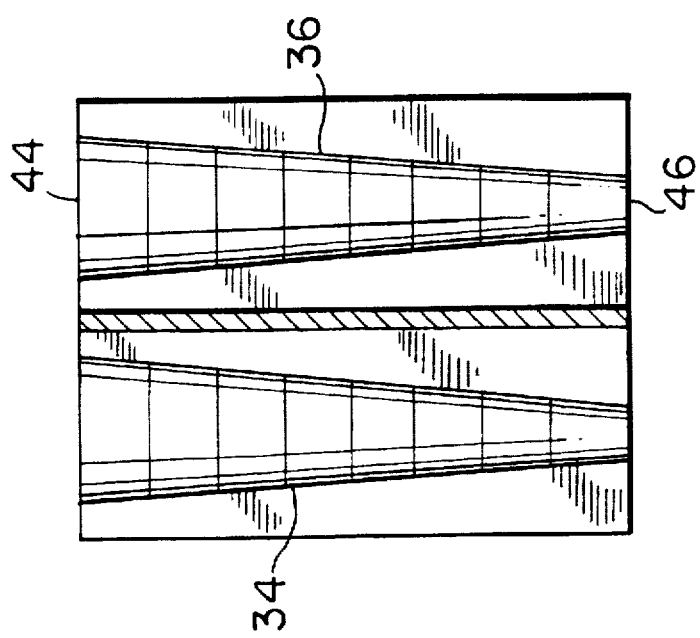
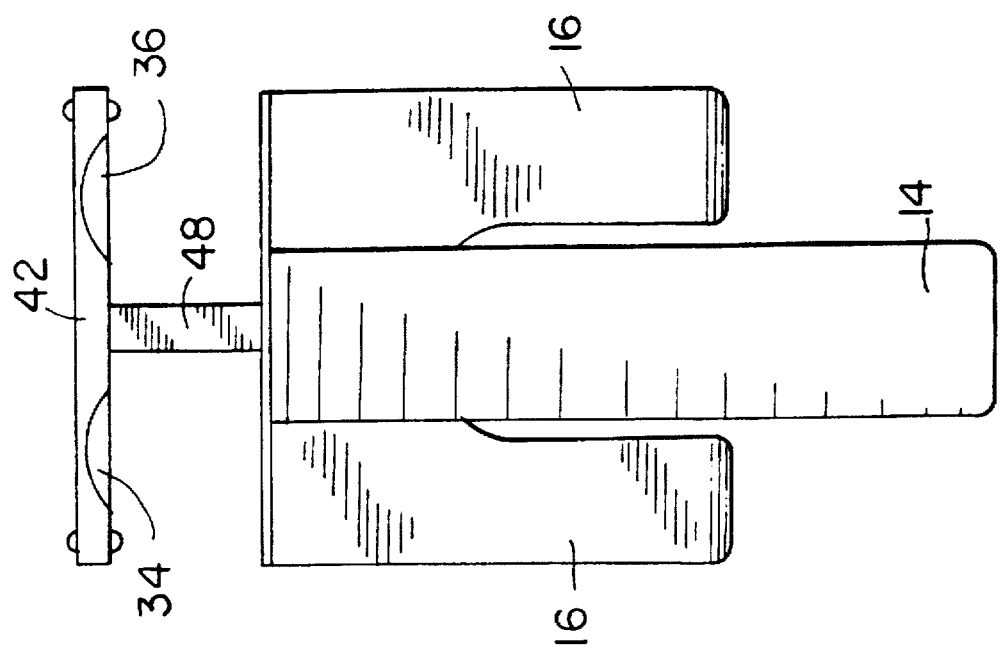

RETAINER FOR RETAINING COOKING UTENSILS OVER COOKWARE

BACKGROUND OF THE INVENTION

1. Field of the Invention

This invention relates generally to a device for and method of retaining cooking utensils, such as spoons, forks, ladles, spatulas, and stirrers over open cookware. The invention also allows a person to easily grasp a cooking utensil by its handle without disturbing the cookware.

2. Discussion of Related Art

During the preparation of food, cooks generally utilize a cooking utensil to stir or mix food in cookware. Immediately after such stirring or mixing, such a utensil accumulates residue from the food. Thereafter, the utensil with the food residue is typically placed on the counter top and may create a messy work area due to drippings from the utensil. Otherwise, the cook may leave the cooking utensil unattended in the cookware between stirring and mixing sequences, thereby avoiding the creation of the messy work area; yet this creates the risk that the utensil will fall or slide into the food. It would be desirable to provide a device that prevents food residue on a utensil from dripping onto the work area and prevents the utensil from sliding into the food.

SUMMARY OF THE INVENTION

The present invention is directed to a retainer that clips to cookware and retains a cooking utensil in a position such that the utensil's end with accumulated food residue remains over the food contents of the cookware, thereby allowing the accumulated food residue on the cooking utensil to drip back into the food. Further, the invention prevents the cooking utensil from sliding into the food when left unattended in the cookware between stirring and mixing sequences. In addition, the cook can easily grasp the utensil by its handle without disturbing the cookware.

The inventive retainer includes a retainer portion and a clip portion. The retainer portion has two surfaces at different elevations when the clip portion is secured to a rim of cookware. A cooking utensil is angled between the two surfaces and retained in position through frictional contact which prevents the cooking utensil from having its food handling end slide into the food within the cookware. The clip portion has depending legs which resiliently secure the inventive retainer to the rim.

The invention will next be described in connection with certain illustrated embodiments; however, it should be clear to those skilled in the art that various modifications, additions and omissions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 1 depicts a perspective view of a first embodiment of the cooking utensil retainer fastened to the rim of cookware and retaining a ladle in position;

FIG. 4 depicts a rear elevational view of the cooking utensil retainer;

FIG. 5 depicts a cross-section across lines 5—5 of FIG. 4 and further showing a bottom view from lines 5—5.

DESCRIPTION OF PREFERRED EMBODIMENT

Figure 3:
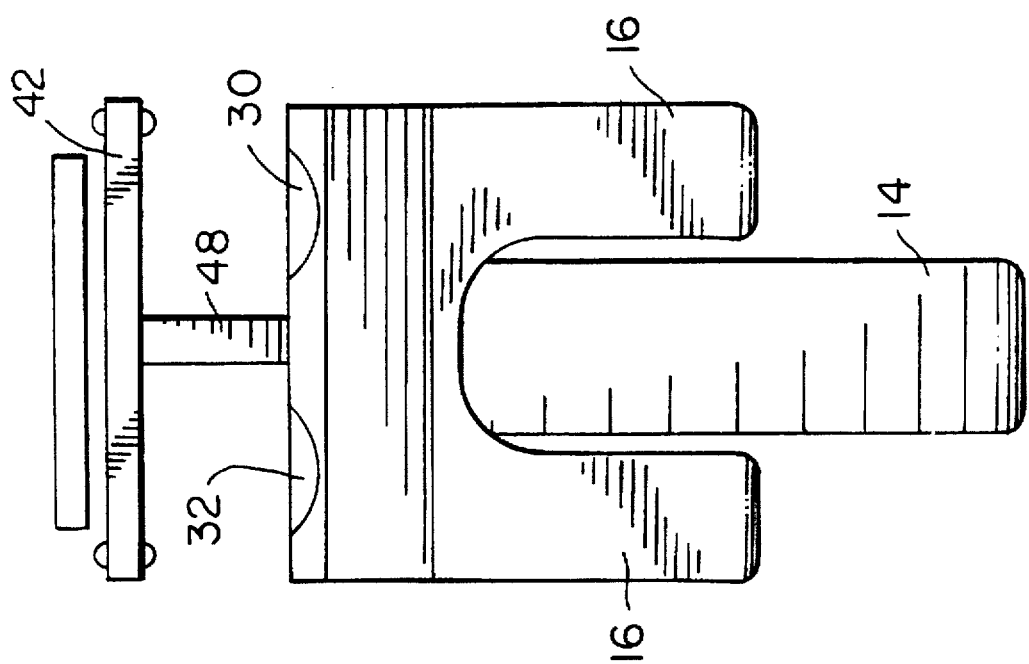
FIG. 3 depicts a left side elevational view of the cooking utensil retainer that mirrors the view from the right side.
Figure 2:
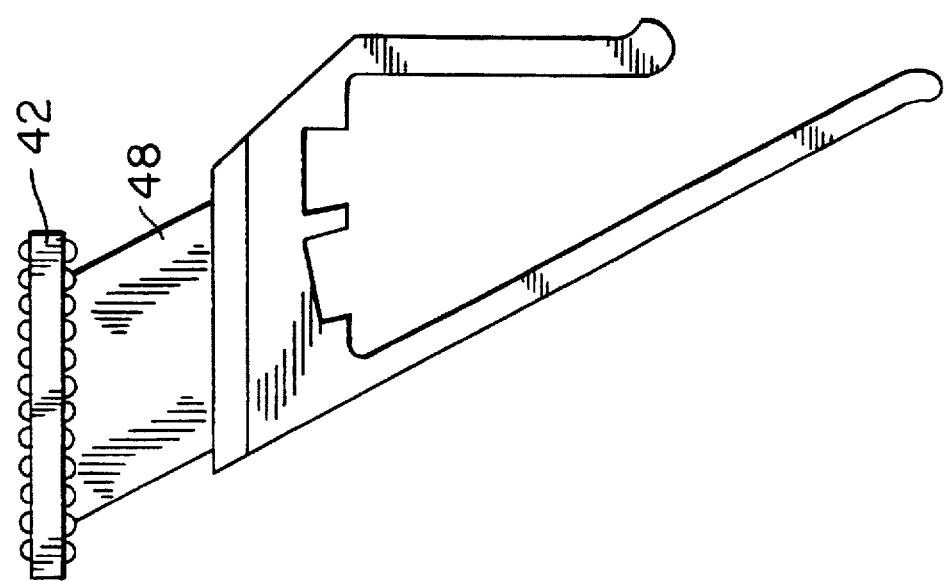
FIG. 2 depicts a front elevational view of the cooking utensil retainer.

Referring to FIGS. 1–5, an embodiment of the retainer 2 is shown with a retaining portion 4 that retains a cooking utensil 6 over open cookware 8, and a clip portion 10 fastened to the rim 12 of the open cookware. The clip portion 10 of the retainer includes at least two spaced legs 14, 16, preferably three legs as shown with two on one side and one on the other side of the rim. At least one of the legs resiliently biases as the legs are positioned on either side of the rim.

To facilitate a snug fit for purposes of maintaining the retainer 2 in a stable orientation, provision may be made for grooves 20, 22 of different sizes each of a dimension suitable for a different size rim thickness. A depending protrusion 24 separates the grooves from each other. Furthermore, the legs which contact the inside surface of the cookware may be shaped to conform to the contour of the inside surface, i.e., curved, to provide for a snug fit. In addition, the grooves 20, 22 may be shaped to conform to the contour of the rim of the cookware, e.g., the top, to provide a snug fit.

The clip portion 4 includes two surfaces 26, 28 at different elevations each having a pair of retention grooves 30, 32 (FIGS. 1 and 3) and 34, 36 (FIGS. 4 and 5) that mirror each other. The retention grooves 30, 32 widen in a direction toward where the utensil 6 is to make contact with it for retaining purposes, that is from end 38 to end 40. Retention grooves 34, 36, however, widen in the opposite direction on the underside of the shelf 42 but also toward the end 44 where contact is to be made with the utensil as opposed to the end 46 at the other side. The shelf 42 is shown as the topmost surface having protruding wings 43 at opposite sides. Each wing 43 has a depending lip that extends toward the surface 28 and is closer to an edge of the surface 29 than to the arm 48. The edge is spaced from the arm 48.

For convenience, an adhesive may be applied to the top of the shelf 42 between the wings to adhere a conventional magnet depicted in FIG. 3. Such a magnet may then be placed into contact with a metallic surface, such as a cabinet, appliance or refrigerator, to retain the utensil retainer to the metallic surface, which may be near the stove. Instead of adhering the magnet to the shelf, the shelf could be formed around the magnet, i.e., so that the magnet is imbedded, with a thin shelf layer serving as the topmost surface. Such a layer must be sufficiently thin to allow magnetic attraction between the magnet and a metallic surface arranged flush against the layer.

The retention grooves need only extend from the wider ends 40, 44 by a distance sufficient to permit the utensil to clear its surface when in the retaining position. The grooves 30, 32 and 34, 36 are ribbed to hinder or prevent sliding.

In some cases, the utensil will not fit or return within the retention grooves. Thus, the utensil may be placed atop the shelf 42. This only means that the retention grooves and opposed surfaces may be dispensed with for that application and replaced by the shelf sitting directly atop the clip portion. Adhering a magnet to the top surface of such a shelf allows the retainer to be magnetically attached to a metallic surface until needed, at which time the retainer is pulled off the metallic surface to break the magnetic attraction.

The retention grooves 30, 32 and 34, 36 themselves slope downwardly in the direction of the center of the cookware when the retainer is secured to the rim of the cookware. In this manner, if the utensil is for some reason not retained by the retainer, it will slip into the open cookware rather than create a mess by slipping in the opposite direction. In addition, this downward angling of the utensil such that the food handling end is lower than the free end of the handle prevents the foodstuff on the food handling end from dripping down along the handle itself.

The distance between the retention grooves 30, 36 and 32, 24 is fixed by an arm 48, which also separates these pairs of opposing grooves from each other. The distance is preferably 1½ to 2 times the diameter of the utensil handle so there is little room for the utensil to be angled at a steep decline that would overcome the retaining friction forces that are afforded by the wider ends of the opposing grooves. The actual distance between edges of the wide ends of the opposing grooves is to some extent arbitrary, although they align with each other, but a distance of 1 to 1¼ inches provides satisfactory results. Preferably, the utensil handle is angled at less than 45 degrees as it extends between the wider ends of the opposing grooves.

The reason for providing two sets of opposing grooves is for the convenience of the user, who may clip the retainer anywhere along the rim of the cookware and may find it cumbersome to position the utensil handle between opposing grooves on whichever pair becomes arranged on the far side of the arm 48. It may be preferable to position the handle between the opposing grooves that are on the close side of the bridge. Obviously, the opposing grooves that are on the close side of the bridge as opposed to the far side varies with the location on the rim that the retainer is secured.

The shelf 42 may conveniently serve as a temporary resting place for items used during the cooking process, such as those which may create a mess if set down elsewhere.

Figure 6:
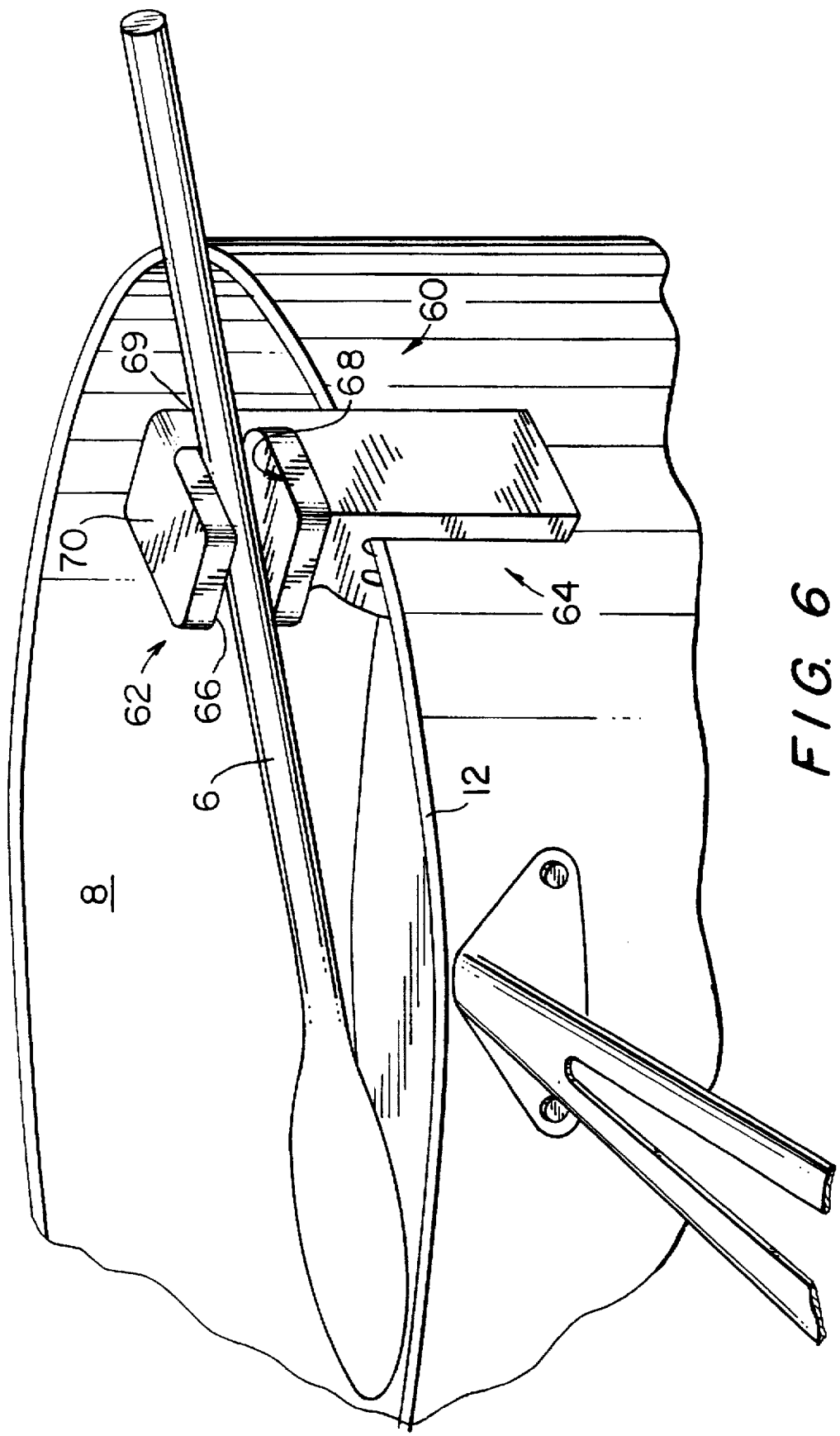
FIG. 6 depicts a perspective view of a second embodiment of the cooking utensil retainer fastened to the rim of cookware and retaining a ladle in position.
Figure 7:
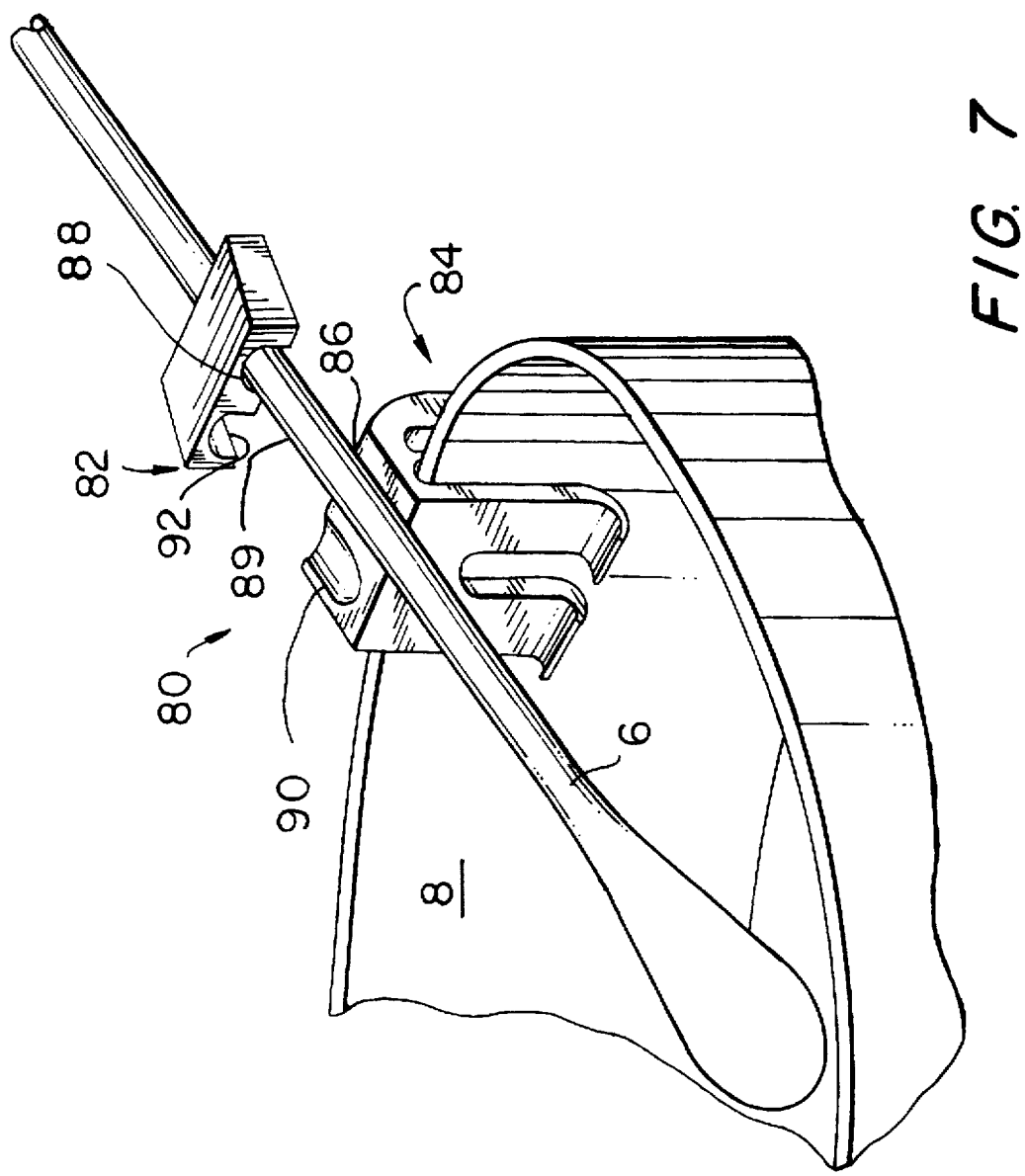
FIG. 7 depicts a perspective view of a third embodiment of the cooking utensil retainer fastened to the rim of cookware and retaining the ladle in position.

FIGS. 6-7 show further embodiments which are a variation of that of FIGS. 1-5. In the embodiment of the FIG. 6, the retainer 60 also has a retaining portion 62 and a clip portion 64, with the clip portion 64 gripping the rim 12 of open cookware 8. The clip portion is substantially identical to that of the embodiment of FIGS. 1-5. The retention portion 62, however, while still having opposed surfaces 66, 68 at different elevations and between which is angled the utensil handle 6, is constructed differently in that its shape defines a sideways U and may or may not have grooves on its surface in the manner of the embodiment of FIGS. 1-5. However, the grooves may run diagonally in the direction along which extends the utensil handle. The spacing between the opposing surfaces may be substantially the same as that of the embodiment of FIGS. 1-5 such that the opposed surfaces 66, 68 are fixed in separated position from each other by an arm 69. Even if the surfaces 66, 68 are flat, the utensil handle may be retained in an angled position. As in the embodiment of FIGS. 1-5, provision is made on the top for a shelf 70 to temporarily support items used in the cooking process.

FIG. 7 is a further embodiment of a retainer 80, but also having a retaining portion 82 and a clip portion 84. There are also two pairs of opposing surfaces 86, 88; 90, 92 at different elevations each having a grooved or beveled portion in which is positioned the utensil handle. Surfaces 86, 88 are fixed in position relative to the surfaces 90, 92 by an arm 89. The utensil 6 is showing with its food handling end positioned over open cookware 8. The spacing between the opposing surfaces is substantially the same as was the case for the embodiment of FIGS. 1-5.

In all the embodiments, the retainer is made from thermoplastic rubber or some heat resistant, FDA approved compound or material or from ULTEM material (manufactured by General Electric) or from SANTROPRENE material or from wood. Such materials do not scratch cookware, are preferably are not heat conductors, and provide friction to prevent sliding.

The grooves for retaining the utensil are preferably ribbed to prevent sliding. Also, relative to the vertically extending legs of the clip portion, the two opposed surfaces of the retention portion define an oblique angle relative to the vertical.

While the invention has been described with respect to preferred embodiments, it will be appreciated that these are set forth merely for purposes of example, and that many variations, modifications and other applications of the invention may be made.

What is claimed is:

1. A device to retain cooking utensils over cookware comprising: a clip portion which includes legs, at least one of the legs being resiliently biased toward at least one of the other of the legs; and a retaining portion extending from the clip portion having two surfaces separated from each other and having an arm interposed between and that maintains a fixed distance between the two surfaces and further bounds the space between the surfaces to allow placement of a cooking utensil to make contact at a respective location on each of the surfaces, the surfaces facing each other, each surface having grooves such that the grooves on the one surface cooperate with the grooves on the other surface to provide frictional surfaces that retain the utensil.

2. The device according to claim 1, wherein the arm is elongated and extends in a direction of elongation from the clip portion at an oblique angle relative to at least one of the legs of the clip portion.

3. The device according to claim 1, wherein the retaining portion comprises a C-shape.

4. The device according to claim 1, wherein the device is made from a heat conduction resistant material.

5. The device according to claim 1, wherein at least one of the legs has a curved shape to conform to a contour of an inner surface of cookware.

6. The device according to claim 1, further comprising a shelf arranged so that the retaining portion is between the shelf and the clip portion.

7. The device according to claim 6, further comprising a magnet arranged so that the retaining portion is between the magnet and the clip portion.

8. The device according to claim 4, further comprising at least one groove between said legs conforming to a contour of an edge of a rim of the cookware.

9. The device as in claim 1, wherein one of said two surfaces has a peripheral edge spaced from said arm, further comprising at least one depending lip extending in a direction toward the other of said two surfaces and being closer to said edge than to said arm.

* * * * *